United States Patent
Koizumi

4,083,628
Apr. 11, 1978

[54] COPYING OBJECTIVE LENS SYSTEM

[75] Inventor: Toshimichi Koizumi, Sagamihara, Japan

[73] Assignee: Olympus Optical Co., Ltd., Japan

[21] Appl. No.: 676,657

[22] Filed: Apr. 13, 1976

[30] Foreign Application Priority Data
Apr. 15, 1975  Japan .................................. 50-45950

[51] Int. Cl.² ............................................. G02B 11/24
[52] U.S. Cl. ..................................................... 350/220
[58] Field of Search ........................................... 350/220

[56] References Cited
U.S. PATENT DOCUMENTS
3,592,531  7/1971  McCrobie ............................. 350/220

*Primary Examiner*—Conrad J. Clark
*Attorney, Agent, or Firm*—Cushman, Darby & Cushman

[57] ABSTRACT

A copying objective lens system of four-component six-element lens configuration comprising a front and rear lens groups arranged symmetrically in respect to the stop positioned at the center, each of said front and rear lens groups comprising a negative cemented doublet lens and positive lens, said copying objective lens system being arranged so that uniform brightness of image can be obtained over the whole field.

3 Claims, 10 Drawing Figures

SPHERICAL ABERRATION

ASTIGMATISM

COMA

SPHERICAL ABERRATION

ASTIGMATISM

COMA

SPHERICAL ABERRATION

ASTIGMATISM

COMA

COPYING OBJECTIVE LENS SYSTEM

BACKGROUND OF THE INVENTION a. Field of the Invention

The present invention relates to a copying objective lens systems and, more particularly, to a copying objective lens system of four-component six-element lens configuration to be used with magnification about X1.

b. Description of the Prior Art

When copying an original of large size, for example 600 mm, with magnification of X1, brightness of the copy should be uniform over the whole field and therefore, for the lens system to be used for this purpose, aperture efficiency should be high and distortion should be minimized. Besides, as the object is flat, flatness of the image should be favourable. Moreover, to facilitate mounting and handling, the lens system should be as compact as possible.

Besides, as copying lens systems to be used with magnification about X1, it is known that the lens system arranged perfectly symmetrically in respect to the stop positioned at the center is more preferable because aberrations can then be corrected favourably. For lens systems arranged perfectly symmetrically, the entrance pupil and exit pupil of offaxial principal rays come to the same plane and, therefore, distortion and lateral chromatic aberration are not caused. To correct aberrations favourably, attention should be therefore paid only to spherical aberration, longitudinal chromatic aberration and astigmatism. For this type of lens system, coma becomes symmetrical and attention is required only to make the value to coma small. Moreover, in practice, the value of coma does not become so large when spherical aberration and astigmatism are corrected favourably. Besides, curvature of field also becomes favourable when increase of astigmatism toward the marginal portion of field and astigmatic difference are small.

However, for this type of lens systems which are commercially available at present, the F number is 9 and, therefore, the image is dark. Moreover, because of vignetting, the image becomes darker at the marginal portion of the field compared with the central portion of the field and brightness of image becomes irregular. To make brightness of image uniform, it is therefore necessary to stop down the lens system. Consequently, the exposure time becomes long and a large illuminating system is required in order to illuminate the object brightly.

SUMMARY OF THE INVENTION

It is, therefore, a primary object of the present invention to provide a copying objective lens system with which uniform intensity of light can be obtained over the whole field even when the lens system is not stopped down.

As shown in FIG. 1, the copying objective lens system according to the present invention has four-component six-element lens configuration and comprises a front lens group and rear lens group which are arranged perfectly symmetrically in respect to the stop positioned at the center. When respective lens components constituting each of the front and rear lens groups are called a first lens component and second lens component in the order from both of the objective side and image side toward the center, each first lens component is a cemented doublet lens having negative refractive power and each second lens component is a positive meniscus lens. Moreover, the copying objective lens system according to the present invention satisfies the following conditions:

$$9 \geq |f_{12}|/f \geq 3 \tag{1}$$

$$|n_1 - n_2| \leq 0.1, n_1 \geq 1.55, \nu_1 \geq 50, \nu_2 \leq 45 \tag{2}$$

$$1.4 \geq f_3/f \geq 0.72 \tag{3}$$

$$0.06 \geq d_5/f \geq 0.04 \tag{4}$$

In the above, reference symbol $f$ represents the focal length of the lens system as a whole, reference symbol $f_{12}$ represents the focal length of the first lens component, reference symbol $f_3$ represents the focal length of the second lens component, reference symbols $n_1$ and $n_2$ respectively represent refractive indices of respective lens elements constituting the first lens component, reference symbols $\nu_1$ and $\nu_2$ respectively represent Abbe's numbers of respective lens elements constituting the first lens component, and reference symbol $d_5$ represents the airspace between the front and rear lens groups.

For the copying objective lens system according to the present invention arranged as described in the above, meaning of respective conditions are as explained below. The condition (1), which defines the range for selecting the refractive power of the first lens component consisting of a cemented doublet lens having negative refractive power, is given for the purpose of favourably correcting astigmatism, spherical aberration and coma. If the focal length $f_{12}$ becomes $9 < |f_{12}|/f$, astigmatism will be overcorrected especially at the marginal portion of field and spherical aberration and coma will be undercorrected. If the focal length $f_{12}$ becomes $3 > |f_{12}|/f$, astigmatism will be undercorrected and spherical aberration and coma will be overcorrected.

If, in the first lens component, the difference between refractive indices of both lens elements becomes $|n_1 - n_2| > 0.1$, astigmatic difference will become large and this is not favourable. However, to correct chromatic aberration favourably, it is more preferable to make said difference of refractive indices as large as possible. To solve this problem, in the present invention, the difference of refractive indices of both lens elements constituting the first lens component is defined as shown by the condition (2). Moreover, Abbe's numbers of said lens elements are also defined as shown by the condition (2) so that the difference between Abbe's numbers of said lens elements becomes large and that chromatic aberration is thereby corrected favorably.

The condition (3) defines the focal length $f_3$ of the second lens component, which is a positive meniscus lens. If $f_3$ becomes $f_3/f < 0.72$, spherical aberration will be undercorrected. If $f_3$ becomes $f_3/f > 1.4$, spherical aberration will be overcorrected.

If, in the condition (4), the airspace $d_5$ between the front and rear lens groups becomes $0.04 > d_5/f$, astigmatic difference becomes too large. When, on the contrary, $d_5$ becomes $0.06 < d_5/f$, astigmatism at the marginal portion of the field will be somewhat overcorrected though astigmatic difference will become small.

DETAILED DESCRIPTION OF THE PREFERRED EMBODIMENTS

Preferred embodiments of the copying objective lens system according to the present invention are as shown below.

Embodiment 1

| | | |
|---|---|---|
| $r_1 = 0.1606$ | | |
| $d_1 = 0.0319$ | $n_1 = 1.62041$ | $\nu_1 = 60.3$ |
| $r_2 = 0.2011$ | | |
| $d_2 = 0.0285$ | $n_2 = 1.64769$ | $\nu_2 = 33.8$ |
| $r_3 = 0.1312$ | | |
| $d_3 = 0.0269$ | | |
| $r_4 = 0.2348$ | | |
| $d_4 = 0.0256$ | $n_3 = 1.55671$ | $\nu_3 = 58.7$ |
| $r_5 = 0.3867$ | | |
| $d_5 = 0.0470$ | | |
| F/8.0, f = 1.0, | $f_{12} = -4.285$, | $f_3 = 1.012$ |

Embodiment 2

| | | |
|---|---|---|
| $r_1 = 0.1488$ | | |
| $d_1 = 0.0267$ | $n_1 = 1.62041$ | $\nu_1 = 60.3$ |
| $r_2 = 0.1822$ | | |
| $d_2 = 0.0230$ | $n_2 = 1.63980$ | $\nu_2 = 34.6$ |
| $r_3 = 0.1247$ | | |
| $d_3 = 0.0241$ | | |
| $r_4 = 0.2346$ | | |
| $d_4 = 0.0199$ | $n_3 = 1.54771$ | $\nu_3 = 63.1$ |
| $r_5 = 0.3750$ | | |
| $d_5 = 0.0585$ | | |
| F/8.0, f = 1.0, | $f_{12} = -4.950$, | $f_4 = 0.805$ |

Embodiment 3

| | | |
|---|---|---|
| $r_1 = 0.1591$ | | |
| $d_1 = 0.0270$ | $n_1 = 1.63854$ | $\nu_1 = 55.4$ |
| $r_2 = 0.3057$ | | |
| $d_2 = 0.0180$ | $n_2 = 1.58144$ | $\nu_2 = 40.7$ |
| $r_3 = 0.1309$ | | |
| $d_3 = 0.0328$ | | |
| $r_4 = 0.2247$ | | |
| $d_4 = 0.0282$ | $n_3 = 1.53996$ | $\nu_3 = 59.5$ |
| $r_5 = 0.3209$ | | |
| $d_5 = 0.0425$ | | |
| F/8.0, f = 1.0, | $f_{12} = -8.795$, | $f_3 = 1.259$ |

In the above, reference symbols $r_1$ through $r_5$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses, and reference symbols $\nu_1$, $\nu_2$ and $\nu_3$ respectively represent Abbe's numbers of respective lenses.

As explained already, the copying objective lens system according to the present invention illustrated by respective embodiments is arranged perfectly symmetrically in respect to the stop positioned at the center. Though the numerical values only for the front lens group are shown in the above for respective embodiments, numerical values for the rear lens group are completely same as those for the front lens group except the fact that "−" symbols should be added to respective numerical values of radii of curvature $r_1$ through $r_5$.

Figure 1:
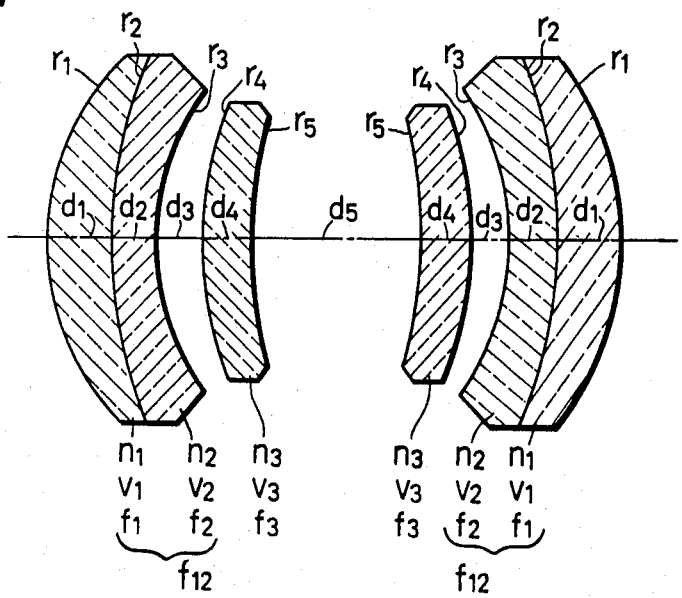
FIG. 1 shows a sectional view of the lens system according to the present invention.
Figure 2A:
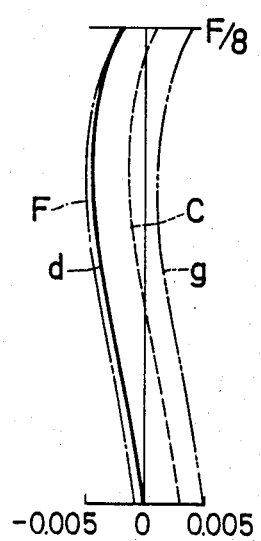
FIGS. 2A, 2B and 2C respectively show graphs illustrating aberration curves of Embodiment 1 of the present invention.
Figure 2B:
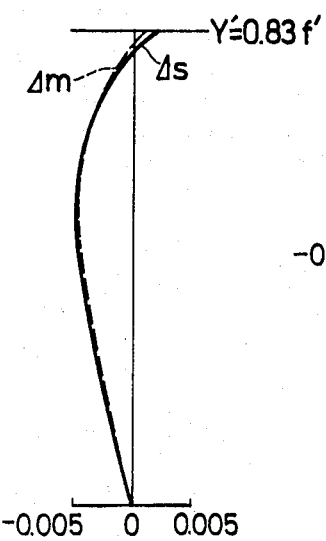
Figure 2C:
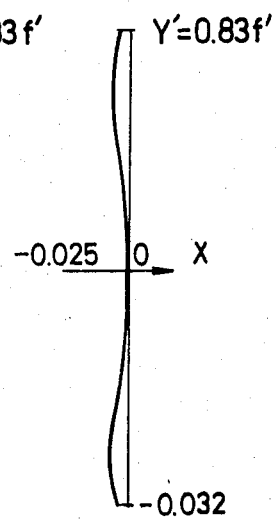
Figure 3A:
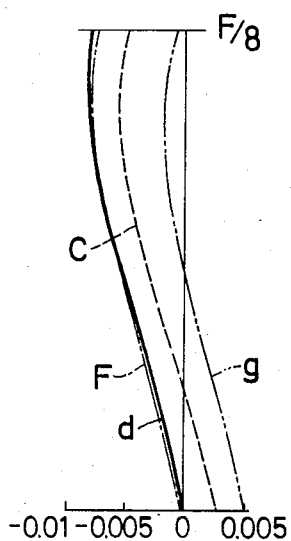
FIGS. 3A, 3B and 3C respectively show graphs illustrating aberration curves of Embodiment 2 of the present invention.
Figure 3B:
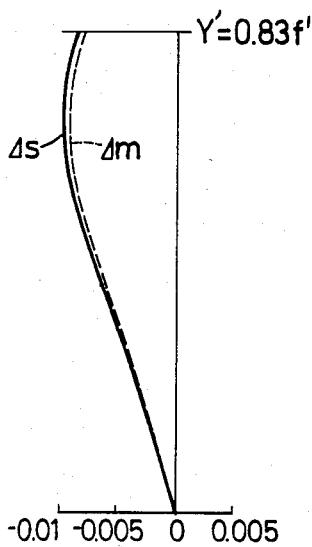
Figure 3C:
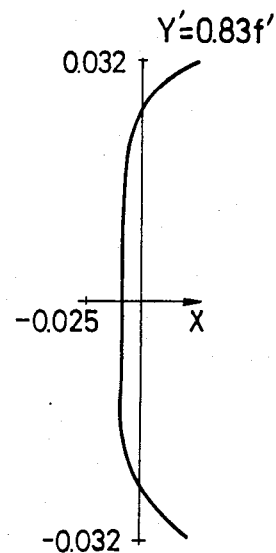
Figure 4A:
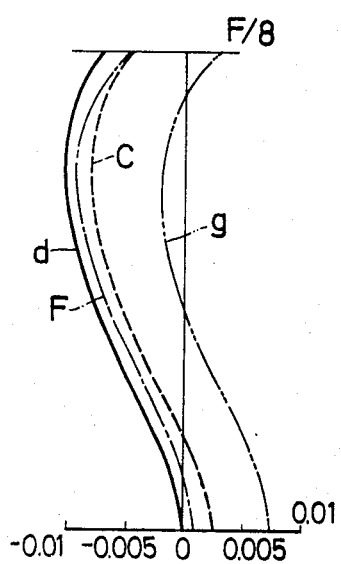
FIGS. 4A, 4B and 4C respectively show graphs illustrating aberration curves of Embodiment 3 of the present invention.
Figure 4B:
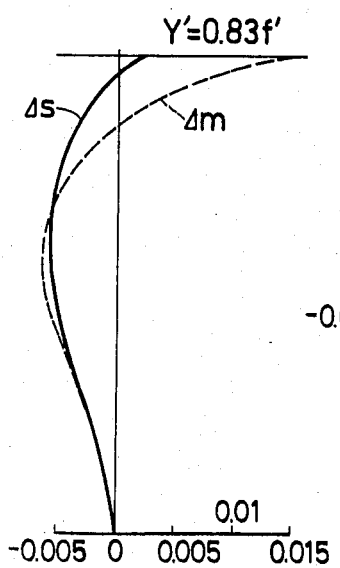
Figure 4C:
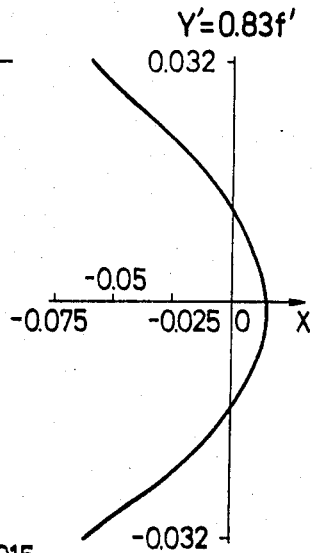

Aberration curves of respective embodiments of the copying objective lens system according to the present invention shown in the above are as illustrated in FIGS. 2A, 2B, 2C, 3A, 3B, 3C, 4A, 4B and 4C. As respective lens systems of these embodiments are arranged perfectly symmetrically in respect to the stop, distortion is not caused and, therefore, is not shown on the drawings.

I claim:

1. A copying objective lens system comprising a front lens group and rear lens group arranged symmetrically in respect to a stop positioned at the center, each of said front and rear lens group comprising a first and second lens components designated in the order from the object side toward the center for the front lens group and from the image side toward the center for the rear lens group, said first lens component being a cemented doublet lens having negative refractive power and consisting of a positive meniscus lens and a negative meniscus lens, said second lens component being a positive meniscus lens, said copying objective lens system having the following numerical data:

| | | |
|---|---|---|
| $r_1 = 0.1606$ | | |
| $d_1 = 0.0319$ | $n_1 = 1.62041$ | $\nu_1 = 60.3$ |
| $r_2 = 0.2011$ | | |
| $d_2 = 0.0285$ | $n_2 = 1.64769$ | $\nu_2 = 33.8$ |
| $r_3 = 0.1312$ | | |
| $d_3 = 0.0269$ | | |
| $r_4 = 0.2348$ | | |
| $d_4 = 0.0256$ | $n_3 = 1.55671$ | $\nu_3 = 58.7$ |
| $r_5 = 0.3867$ | | |
| $d_5 = 0.0470$ | | |
| F/8.0, f = 1.0, | $f_{12} = -4.285$, | $f_3 = 1.012$ | wherein reference symbols $r_1$ through $r_5$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses, and reference symbols $\nu_1$, $\nu_2$ and $\nu_3$ respectively represent Abbe's numbers of respective lenses, reference symbol $f_{12}$ represents the focal length of the first lens component, reference symbol $f_3$ represents the focal length of the second lens component, reference symbol $f$ represents the focal length of the lens system as a whole.

2. A copying objective lens system comprising a front lens group and rear lens group arranged symmetrically in respect to a stop positioned at the center, each of said front and rear lens group comprising a first and second lens components designated in the order from the object side toward the center for the front lens group and from the image side toward the center for the rear lens group, said first lens component being a cemented doublet lens having negative refractive power and consisting of a positive meniscus lens and a negative meniscus lens, said second lens component being a positive meniscus lens, said copying objective lens system having the following numerical data:

| | | |
|---|---|---|
| $r_1 = 0.1488$ | | |
| $d_1 = 0.0267$ | $n_1 = 1.62041$ | $\nu_1 = 60.3$ |
| $r_2 = 0.1822$ | | |
| $d_2 = 0.0230$ | $n_2 = 1.63980$ | $\nu_2 = 34.6$ |
| $r_3 = 0.1247$ | | |
| $d_3 = 0.0241$ | | |
| $r_4 = 0.2346$ | | |

-continued

| | | |
|---|---|---|
| $d_4 = 0.0199$ | $n_3 = 1.54771$ | $\nu_3 = 63.1$ |
| $r_5 = 0.3750$ | | |
| $d_5 = 0.0585$ | | |
| F/8.0, f = 1.0, | $f_{12} = -4.950$, | $f_3 = 0.805$ | wherein reference symbols $r_1$ through $r_5$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses, and reference symbols $\nu_1$, $\nu_2$ and $\nu_3$ respectively represent Abbe's numbers of respective lenses, reference symbol $f_{12}$ represents the focal length of the first lens component, reference symbol $f_3$ represents the focal length of the second lens component, reference symbol $f$ represents the focal length of the lens system as a whole.

3. A copying objective lens system comprising a front lens group and rear lens group arranged symmetrically in respect to a stop positioned at the center, each of said front and rear lens group comprising a first and second lens components designated in the order from the object side toward the center for the front lens group and from the image side toward the center for the rear lens group, said first lens component being a cemented doublet lens having negative refractive power and consisting of a positive meniscus lens and a negative meniscus lens, said second lens component being a positive meniscus lens, said copying objective lens system having the following numerical data:

| | | |
|---|---|---|
| $r_1 = 0.1591$ | | |
| $d_1 = 0.0270$ | $n_1 = 1.63854$ | $\nu_1 = 55.4$ |
| $r_2 = 0.3057$ | | |
| $d_2 = 0.0180$ | $n_2 = 1.58144$ | $\nu_2 = 40.7$ |
| $r_3 = 0.1309$ | | |
| $d_3 = 0.0328$ | | |
| $r_4 = 0.2247$ | | |
| $d_4 = 0.0282$ | $n_3 = 1.53996$ | $\nu_3 = 59.5$ |
| $r_5 = 0.3209$ | | |
| $d_5 = 0.0425$ | | |
| F/8.0, f = 1.0, | $f_{12} = -8.795$, | $f_3 = 1.259$ | wherein reference symbols $r_1$ through $r_5$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses, and reference symbols $\nu_1$, $\nu_2$ and $\nu_3$ respectively represent Abbe's numbers of respective lenses, reference symbol $f_{12}$ represents the focal length of the first lens component, reference symbol $f_3$ represents the focal length of the second lens component, reference symbol $f$ represents the focal length of the lens system as a whole.

* * * * *